(12) United States Patent
Wierzbicki et al.

(10) Patent No.: US 8,729,155 B2
(45) Date of Patent: May 20, 2014

(54) INTUMESCENT MATERIAL FOR FIRE PROTECTION

(75) Inventors: Michele Wierzbicki, Salt Lake City, UT (US); Joseph A. Fernando, Amherst, NY (US); Kevin D. Packard, Grand Island, NY (US); Kenneth B. Miller, Lockport, NY (US)

(73) Assignee: Unifrax I LLC, Tonawanda, NY (US)

( * ) Notice: Subject to any disclaimer, the term of this patent is extended or adjusted under 35 U.S.C. 154(b) by 78 days.

(21) Appl. No.: 12/947,149

(22) Filed: Nov. 16, 2010

(65) Prior Publication Data

US 2011/0136937 A1   Jun. 9, 2011

Related U.S. Application Data

(60) Provisional application No. 61/261,450, filed on Nov. 16, 2009.

(51) Int. Cl.
```
C08K 3/04      (2006.01)
C08K 3/34      (2006.01)
C09K 21/00     (2006.01)
C09K 21/02     (2006.01)
C09K 21/04     (2006.01)
```

(52) U.S. Cl.
USPC ........... 523/179; 524/414; 524/442; 524/444; 524/445; 524/447; 524/493; 524/494; 524/495

(58) Field of Classification Search
USPC ........... 523/179; 524/442, 444, 49, 494, 495, 524/414, 445, 447, 493
See application file for complete search history.

(56) References Cited

U.S. PATENT DOCUMENTS

| | | | |
|---|---|---|---|
| 4,952,615 A | 8/1990 | Welna | |
| 5,384,188 A | 1/1995 | Lebold et al. | |
| 5,476,891 A | 12/1995 | Welna | |
| 5,508,321 A | 4/1996 | Brebner | |
| 5,830,319 A | 11/1998 | Landin | |
| 6,051,193 A | 4/2000 | Langer et al. | |
| 6,102,995 A | 8/2000 | Hutchings et al. | |
| 6,112,488 A | 9/2000 | Olson et al. | |
| 6,153,668 A | 11/2000 | Gestner et al. | |
| 6,228,914 B1 | 5/2001 | Ford et al. | |
| 6,274,647 B1 | 8/2001 | Knight et al. | |
| 6,403,180 B1 | 6/2002 | Barrall | |
| 6,458,418 B2 | 10/2002 | Langer et al. | |
| 6,521,834 B1 | 2/2003 | Dykhoff et al. | |
| 6,747,074 B1 | 6/2004 | Buckingham et al. | |
| 2003/0207155 A1 | 11/2003 | Morrison et al. | |
| 2003/0215640 A1 | 11/2003 | Ackerman et al. | |
| 2004/0258900 A1 | 12/2004 | Simon et al. | |
| 2005/0031843 A1 | 2/2005 | Robinson et al. | |

FOREIGN PATENT DOCUMENTS

| | | |
|---|---|---|
| DE | 1 176 546 B | 8/1964 |
| EP | 0 706 979 A1 | 4/1996 |
| EP | 1 498 463 A1 | 1/2005 |
| GB | 2 273 100 A | 6/1994 |
| WO | WO 99/38933 A1 | 8/1999 |
| WO | WO 00/58419 A1 | 10/2000 |
| WO | WO 2009/052015 A2 | 4/2009 |

OTHER PUBLICATIONS

International Search Report, Form PCT/ISA/210 and Written Opinion, Form PCT/ISA/237 for PCT International Patent Application No. PCT/US2010/056835.
International Search Report, Form PCT/ISA/210 for PCT International Patent Application No. PCT/US2011/033440, mailing date Jan. 2, 2012.
Written Opinion, Form PCT/ISA/237 for PCT International Patent Application No. PCT/US2011/033440, mailing date Jan. 2, 2012.

*Primary Examiner* — Kriellion Sanders

(74) *Attorney, Agent, or Firm* — Curatolo Sidoti Co., LPA; Joseph G. Curatolo; Salvatore A. Sidoti

(57) ABSTRACT

A flexible or rigid intumescent material for fire protection applications. The intumescent material includes inorganic fibers, intumescent material, and a char strength enhancer that is different from the intumescent material and binder. The intumescent material exhibits a high expansion ratio and char strength, without substantial shrinkage, in response to elevated temperatures normally encountered during a fire.

31 Claims, 2 Drawing Sheets ved is an intumescent fire protection material. The
INTUMESCENT MATERIAL FOR FIRE PROTECTION

CROSS REFERENCE TO RELATED APPLICATIONS

This application claims the benefit of the filing date under 35 U.S.C. §119(e) of U.S. Provisional Application No. 61/261,450 filed Nov. 16, 2009, which is hereby incorporated by reference.

TECHNICAL FIELD

Disclosed is an intumescent material for use in fire protection applications, such as heat-activated firestops around doors and pipes, in openings through walls, floors and ceilings in buildings, and over fiber-reinforced polymer composites.

BACKGROUND

Intumescent materials are used for a variety of passive fire protection applications. Such intumescent materials generally comprise a mixture of heat resistant inorganic fibers and an intumescent substance. In use, the intumescent material is applied to a surface to be protected from fire. In the event of a fire, the presence of the intumescent substance causes the intumescent material to expand to form an effective seal against the passage of fire and smoke.

The degree to which the intumescent fire protection material expands is important during a fire event, as the intumescent fire protection material must fill the space it is designed to occupy and must do so at a rapid rate. Accordingly, intumescence at the temperatures commonly encountered in a fire event, rapid rate of expansion, and a high degree of expansion are all desirable performance properties of an intumescent fire protection material. A high degree of expansion ensures that the intumescent fire protection material will expand firmly against the periphery of the opening to be sealed, thereby providing an effective seal against the passage of fire and smoke.

Certain prior art intumescent fire protection materials, such as intumescent gaskets, glazings and pipe wraps, consist of either a graphite-based sheet material or a sodium silicate-based sheet material. Each of these materials has advantages over the other. While expandable graphite possesses a larger expansion ratio at temperatures commonly encountered in a fire, the use of the material is limited by its char strength. On the other hand, the sodium-silicate-based fire protection materials possess higher char strengths, but are limited in use due to their lower expansion ratio at temperatures encountered in a fire.

It is important in fire protections applications that, once the fire protection material has expanded in response to exposure to elevated temperatures during a fire, that the material cannot shrink if maintained at the increased temperature or exposed to repeated heating and cooling thermal cycling. Because of the low char strengths of sodium silicate-based materials, shrinkage occurs in both situations.

Accordingly, it is desirable to provide an intumescent material that possesses high degree of expansion and char strengths for use in passive fire protection applications, which does not exhibit substantial shrinkage upon prolonged exposure to elevated temperatures or thermal cycling.

DETAILED DESCRIPTION

Figure 1:
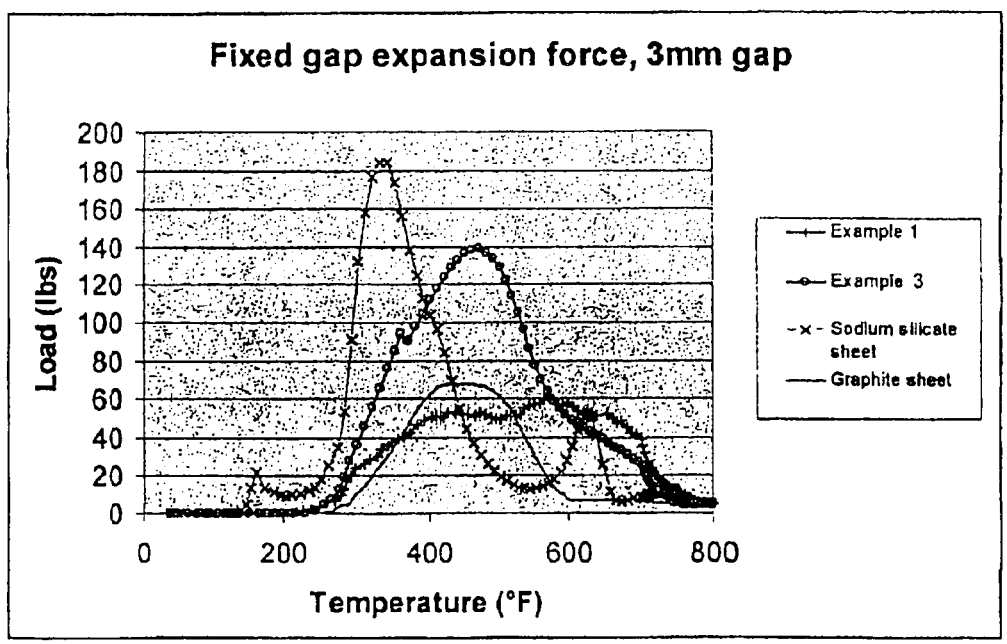
FIG. 1 is a graph depicting the expansion force as a function of temperature for the inventive intumescent mat materials as well as intumescent mat materials of the prior art.
Figure 2:
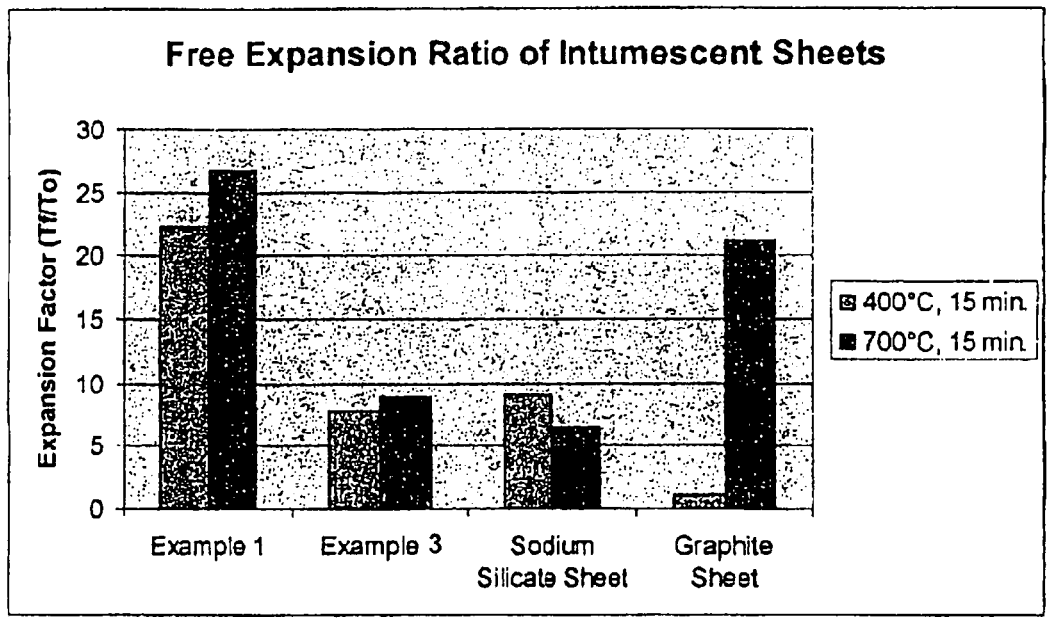
FIG. 2 is a graph depicting the expansion ratios for the inventive intumescent mat materials as well as intumescent mat materials of the prior art.

Provided is an intumescent fire protection material. The intumescent fire protection material comprises inorganic fibers, intumescent material, char strength enhancer, and binder.

Also provided is a process for preparing an intumescent fire protection material comprising preparing a sheet comprising inorganic fibers, intumescent substance and binder, and applying a char strength enhancer to the sheet. Alternatively, the process for preparing an intumescent fire protection material comprises preparing a sheet comprising inorganic fibers, an intumescent substance, a char strength enhancer and a binder.

According to certain embodiments, the intumescent fire protection material comprises from about 10 to about 50 weight percent inorganic fiber, from about 20 to about 50 weight percent intumescent material, from about 10 to about 50 weight percent char strength enhancer, and from about 2 to about 20 weight percent binder.

According to other embodiments, the intumescent fire protection material may also comprise about 35 weight percent inorganic fiber, about 30 weight percent intumescent material, about 30 weight percent char strength enhancer, and about 5 weight percent binder.

According to certain embodiments, the high temperature resistant inorganic fibers that may be used to prepare the intumescent fire protection material include, without limitation, polycrystalline fibers, such as high alumina polycrystalline fibers, refractory ceramic fibers such as alumino-silicate fibers, alumina-magnesia-silica fibers, mineral wool fibers, kaolin fibers, alkaline earth silicate fibers, such as calcia-magnesia-silica fibers and magnesia-silica fibers, S-glass fibers, S2-glass fibers, E-glass fibers, quartz fibers, silica fibers and combinations thereof.

According to certain embodiments, the mineral wool fibers that may be used to prepare the intumescent fire protection material include, without limitation, at least one of rock wool fibers, slag wool fibers, basalt fibers and combinations thereof.

According to certain embodiments, the heat resistant inorganic fibers that are used to prepare the intumescent fire protection materials comprise ceramic fibers. Without limitation, suitable ceramic fibers include alumina fibers, alumina-silica fibers, alumina-zirconia-silica fibers, zirconia-silica fibers, zirconia fibers and combinations thereof.

Without limitation, suitable refractory ceramic fibers (RCF) typically comprise alumina and silica, and typically contain from about 45 to about 60 percent by weight alumina and from about 40 to about 55 percent by weight silica. The RCF fibers are a fiberization product that may be blown or spun from a melt of the component materials. RCF may additionally comprise the fiberization product of alumina, silica and zirconia. In certain embodiments, the amounts of alumina, silica and zirconia may range from about 29 to about 31 percent by weight alumina, from about 53 to about 55 percent by weight silica, and about 15 to about 17 weight percent zirconia. RCF fiber length is typically less than about 5 mm, and the average fiber diameter range is from about 0.5 μm to about 12 μm.

A useful refractory alumina-silica ceramic fiber is commercially available from Unifrax I LLC (Niagara Falls, N.Y.) under the registered trademark FIBERFRAX. The FIBER- FRAX ceramic fibers comprise the fiberization product of about 45 to about 75 weight percent alumina and about 25 to about 55 weight percent silica. The FIBERFRAX fibers exhibit operating temperatures of up to about 1540° C. and a melting point up to about 1870° C.

According to certain embodiments, the refractory ceramic fibers useful in this embodiment are melt-formed ceramic fibers containing alumina and silica, including but not limited to melt spun refractory ceramic fibers. These include aluminosilicates, such as those aluminosilicate fibers having from about 40 to about 60 percent alumina and from about 60 to about 40 percent silica, and some embodiments, from about 47 to about 53 percent alumina and from about 47 to about 53 percent silica.

The FIBERFRAX fibers are easily formed into high temperature resistant sheets and papers. The FIBERFRAX fibers are made from bulk alumino-silicate glassy fiber having approximately 50/50 alumina/silica and a 70/30 fiber/shot ratio. About 93 weight percent of this paper product is ceramic fiber/shot, the remaining 7 percent being in the form of an organic latex binder.

The high temperature resistant inorganic fibers may include polycrystalline oxide ceramic fibers such as mullite, alumina, high alumina aluminosilicates, aluminosilicates, titania, chromium oxide and the like. Suitable polycrystalline oxide refractory ceramic fibers and methods for producing the same are contained in U.S. Pat. Nos. 4,159,205 and 4,277,269, which are incorporated herein by reference. FIBERMAX® polycrystalline mullite ceramic fibers are available from Unifrax I LLC (Niagara Falls, N.Y.) in blanket, mat or paper form.

The alumina/silica FIBERMAX® fibers comprise from about 40 weight percent to about 60 weight percent $Al_2O_3$ and about 60 weight percent to about 40 weight percent $SiO_2$. The fiber may comprise about 50 weight percent $Al_2O_3$ and about 50 weight percent $SiO_2$. The alumina/silica/magnesia glass fiber typically comprises from about 64 weight percent to about 66 weight percent $SiO_2$, from about 24 weight percent to about 25 weight percent $Al_2O_3$, and from about 9 weight percent to about 10 weight percent MgO. The E-glass fiber typically comprises from about 52 weight percent to about 56 weight percent $SiO_2$, from about 16 weight percent to about 25 weight percent CaO, from about 12 weight percent to about 16 weight percent $Al_2O_3$, from about 5 weight percent to about 10 weight percent $B_2O_3$, up to about 5 weight percent MgO, up to about 2 weight percent of sodium oxide and potassium oxide, and trace amounts of iron oxide and fluorides, with a typical composition of 55 weight percent $SiO_2$, 15 weight percent $Al_2O_3$, 7 weight percent $B_2O_3$, 3 weight percent MgO, 19 weight percent CaO and traces of the above mentioned materials.

The fibers may comprise at least one of an amorphous alumina/silica fiber, an alumina/silica/magnesia fiber (such as S-2 Glass from Owens Corning, Toledo, Ohio), mineral wool, E-glass fiber, magnesia-silica fibers, such as ISOFRAX® fibers from Unifrax I LLC, Niagara Falls, N.Y., or calcia-magnesia-silica fibers, such as INSULFRAX® fibers from Unifrax I LLC, Niagara Falls, N.Y. or SUPERWOOL™ fibers from Thermal Ceramics Company.

According to other embodiments, biosoluble alkaline earth silicate fibers can be used to prepare the intumescent fire protection materials. Suitable alkaline earth silicate fibers include those biosoluble alkaline earth silicate fibers disclosed in U.S. Pat. Nos. 6,953,757, 6,030,910, 6,025,288, 5,874,375, 5,585,312, 5,332,699, 5,714,421, 7,259,118, 7,153,796, 6,861,381, 5,955,389, 5,928,075, 5,821,183, and 5,811,360, each of which are hereby incorporated by reference.

The biosoluble alkaline earth silicate fibers may comprise the fiberization product of a mixture of oxides of magnesium and silica. These fibers are commonly referred to as magnesium-silicate fibers. The magnesium-silicate fibers generally comprise the fiberization product of about 60 to about 90 weight percent silica, from greater than 0 to about 35 weight percent magnesia and 5 weight percent or less impurities. According to certain embodiments, the alkaline earth silicate fibers comprise the fiberization product of about 65 to about 86 weight percent silica, about 14 to about 35 weight percent magnesia and 10 weight percent or less impurities. According to other embodiments, the alkaline earth silicate fibers comprise the fiberization product of about 70 to about 86 weight percent silica, about 14 to about 30 weight percent magnesia, and 10 weight percent or less impurities. A suitable magnesium-silicate fiber is commercially available from Unifrax I LLC (Niagara Falls, N.Y.) under the registered trademark ISOFRAX. Commercially available ISOFRAX fibers generally comprise the fiberization product of about 70 to about 80 weight percent silica, about 18 to about 27 weight percent magnesia and 4 weight percent or less impurities. ISOFRAX alkaline earth silicate fibers may have an average diameter of about 1 micron to about 3.5 microns; in some embodiments, about 2 to about 2.5 microns.

The biosoluble alkaline earth silicate fibers may alternatively comprise the fiberization product of a mixture of oxides of calcium, magnesium and silica. These fibers are commonly referred to as calcia-magnesia-silica fibers. According to certain embodiments, the calcia-magnesia-silicate fibers comprise the fiberization product of about 45 to about 90 weight percent silica, from greater than 0 to about 45 weight percent calcia, from greater than 0 to about 35 weight percent magnesia, and 10 weight percent or less impurities. Useful calcia-magnesia-silicate fibers are commercially available from Unifrax I LLC (Niagara Falls, N.Y.) under the registered trademark INSULFRAX. INSULFRAX fibers generally comprise the fiberization product of about 61 to about 67 weight percent silica, from about 27 to about 33 weight percent calcia, and from about 2 to about 7 weight percent magnesia. Other suitable calcia-magnesia-silicate fibers are commercially available from Thermal Ceramics (Augusta, Ga.) under the trade designations SUPERWOOL 607 and SUPERWOOL 607 MAX and SUPERWOOL HT. SUPERWOOL 607 fibers comprise about 60 to about 70 weight percent silica, from about 25 to about 35 weight percent calcia, and from about 4 to about 7 weight percent magnesia, and trace amounts of alumina. SUPERWOOL 607 MAX fibers comprise about 60 to about 70 weight percent silica, from about 16 to about 22 weight percent calcia, and from about 12 to about 19 weight percent magnesia, and trace amounts of alumina. SUPERWOOL HT fibers comprise about 74 weight percent silica, about 24 weight percent calcia and trace amounts of magnesia, alumina and iron oxide.

According to certain embodiments, the intumescent fire protection material may optionally comprise other known non-respirable inorganic fibers, such as silica fibers, leached silica fibers (bulk or chopped continuous), S-glass fibers, S2 glass fibers, E-glass fibers, fiberglass fibers, chopped continuous mineral fibers, and combinations thereof and the like, suitable for the particular temperature applications desired. Such inorganic fibers may be added to the material in quantities of from greater than 0 to about 40 percent by weight, based upon 100 percent by weight of the total material.

Leached silica fibers may be leached using any techniques known in the art, such as by subjecting glass fibers to an acid solution or other solution suitable for extracting the non-siliceous oxides and other components from the fibers. A process for making leached glass fibers is contained in U.S. Pat. No. 2,624,658 and in European Patent Application Publication No. 0973697.

Examples of suitable leached glass fibers include those leached glass fibers available from BelChem Fiber Materials GmbH, Germany, under the trademark BELCOTEX and from Hitco Carbon Composites, Inc. of Gardena, Calif., under the registered trademark REFRASIL, and from Polotsk-Steklovolokno, Republic of Belarus, under the designation PS-23(R).

Generally, the leached glass fibers will have a silica content of at least 67 percent by weight. In certain embodiments, the leached glass fibers contains at least 90 percent by weight, and in certain of these, from about 90 percent by weight to less than 99 percent by weight silica. The fibers are also substantially shot free.

The average fiber diameter of these leached glass fibers may be greater than at least about 3.5 microns, and often greater than at least about 5 microns. On average, the glass fibers typically have a diameter of about 9 microns, up to about 14 microns. Thus, these leached glass fibers are non-respirable.

The BELCOTEX fibers are standard type, staple fiber pre-yarns. These fibers have an average fineness of about 550 tex and are generally made from silicic acid modified by alumina. The BELCOTEX fibers are amorphous and generally contain about 94.5 silica, about 4.5 percent alumina, less than 0.5 percent sodium oxide, and less than 0.5 percent of other components. These fibers have an average fiber diameter of about 9 microns and a melting point in the range of 1500° to 1550° C. These fibers are heat resistant to temperatures of up to 1100° C., and are typically shot free and binder free.

The REFRASIL fibers, like the BELCOTEX fibers, are amorphous leached glass fibers high in silica content for providing thermal insulation for applications in the 1000° to 1100° C. temperature range. These fibers are between about 6 and about 13 microns in diameter, and have a melting point of about 1700° C. The fibers, after leaching, typically have a silica content of about 95 percent by weight. Alumina may be present in an amount of about 4 percent by weight with other components being present in an amount of 1 percent or less.

The PS-23 (R) fibers from Polotsk-Steklovolokno are amorphous glass fibers high in silica content and are suitable for thermal insulation for applications requiring resistance to at least about 1000° C. These fibers have a fiber length in the range of about 5 to about 20 mm and a fiber diameter of about 9 microns. These fibers, like the REFRASIL fibers, have a melting point of about 1700° C.

In certain alternative embodiments, fibers such as S2-glass and the like may be added to the intumescent fire protection materials in quantities of from greater than 0 to about 50 percent by weight, based upon 100 percent by weight of the material. S2-GLASS fibers typically contain from about 64 to about 66 percent silica, from about 24 to about 25 percent alumina, and from about 9 to about 10 percent magnesia. S2-GLASS fibers are commercially available from Owens Corning, Toledo, Ohio.

In other alternative embodiments, the panel may include refractory ceramic fibers in addition to the leached glass fibers. When refractory ceramic fibers, that is, alumina/silica fibers or the like are utilized, they may be present in an amount ranging from greater than 0 to less than about 50 percent by weight, based upon 100 percent by weight of the total material.

The intumescent substance that may be used to prepare the intumescent fire protection material includes, without limitation, unexpanded vermiculite, expandable graphite, hydrobiotite, water-swelling tetrasilicic flourine mica, or mixtures thereof. The intumescent fire protection material may include a mixture of more than one type of intumescent material. According to certain illustrative embodiments, the intumescent substance used to prepare the intumescent fire protection material comprises expandable graphite.

The intumescent fire protection material further incorporates an effective amount of a char strength enhancing material. Without limitation, the char strength enhancing material comprises alkali metal silicates, colloidal silicas, colloidal alumina, colloidal zirconia, inorganic acids and phosphates. According to certain illustrative embodiments, the char strength enhancing material comprises an alkali metal silicate, such as sodium silicate.

The intumescent fire protection material includes a binder or mixture of more than one type of binder. Suitable binders include organic binders, inorganic binders and mixtures of these two types of binders. According to certain embodiments, the intumescent fire protection material includes one or more organic binders. The organic binders may be provided as a solid, a liquid, a solution, a dispersion, a latex, or similar form. The organic binder may comprise a thermoplastic or thermoset binder, which after cure is a flexible material. Examples of suitable organic binders include, but are not limited to resins of acrylic latex, (meth)acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, silicones, and the like. Other resins include low temperature, flexible thermosetting resins such as unsaturated polyesters, epoxy resins and polyvinyl esters. According to certain embodiments, the intumescent fire protection material utilizes an acrylic latex binder.

Alternatively, organic binders based on natural polymers may be used as the binder component of the intumescent fire protection material. Without limitation, and only by way of illustration, a suitable organic binder that may be used in the intumescent fire protection material may comprise a starch polymer, such as a starch polymer that is derived from corn or potato starch.

The organic binder may be included in the mounting mat in an amount from 2 to about 20 weight percent, from about 3 to about 15 weight percent, from about 5 to about 10 weight percent and from about 2 to about 8 weight percent, based on the total weight of the intumescent material.

The intumescent fire protection material may include polymeric binder fibers instead of, or in combination with, the resinous or liquid binder. These polymeric binder fibers may be used in amounts ranging from greater than 0 to about 20 percent by weight, from about 1 to about 15 weight percent, and from about 2 to about 10 weight percent, based upon 100 percent by weight of the total composition. Suitable examples of binder fibers include polyvinyl alcohol fibers, polyolefin fibers, such as polyethylene and polypropylene, acrylic fibers, polyester fibers, ethyl vinyl acetate fibers, nylon fibers and combinations thereof. The binder fiber may be a bi-component fiber comprising two different types of organic polymer. Without limitation, and only by way of illustration, a suitable bi-component fiber may comprise a fiber having a core-sheath structure with one polymer material comprising the core and a second different polymer material comprising the sheath surrounding the core.

According to certain embodiments, the material may also include at least one clay material. Suitable clays that may be included in the fire protection material include, without limitation, attapulgite, ball clay, bentonite, hectorite, kyanite, kaolinite, montmorillonite, palygorskite, saponite, sepiolite, silimanite, or combinations thereof.

According to certain embodiments, the intumescent fire protection material comprises about 20 to about 50 weight percent expandable graphite, about 15 to about 50 weight percent heat resistant fibers, about 10 to about 50 weight percent char strength enhancer, and about 2 to about 20 weight percent organic binder.

According to certain embodiments, the intumescent fire protection material comprises about 20 to about 40 weight percent expandable graphite, about 25 to about 40 weight percent heat resistant fibers, about 20 to about 40 weight percent char strength enhancer, and about 3 to about 15 weight percent organic binder.

According to other embodiments, the intumescent fire protection material comprises about 20 to about 50 weight percent expandable graphite, about 15 to about 50 weight percent heat resistant inorganic fibers, about 10 to about 50 weight percent sodium silicate as the char strength enhancer, and about 2 to about 20 weight percent acrylic latex organic binder.

According to certain embodiments, the intumescent fire protection material comprises about 30 weight percent expandable graphite, about 35 weight percent heat resistant inorganic fibers, about 30 weight percent char strength enhancer, and about 5 weight percent organic binder.

According to certain embodiments, the intumescent fire protection material comprises about 30 weight percent expandable graphite, about 35 weight percent ceramic fibers as the heat resistant inorganic fibers, about 30 weight percent sodium silicate as the char strength enhancer, and about 5 weight percent acrylic latex as organic binder.

The process for preparing the intumescent fire protection material includes preparing a sheet material comprising inorganic fibers, intumescent substance and binder, and a char strength enhancer. The intumescent fire protection material may be produced in any way known in the art for forming sheet-like materials. For example, conventional paper-making processes, either hand laid or machine laid, may be used to prepare the intumescent sheet material. A handsheet mold, a Fourdrinier paper machine, or a rotoformer paper machine can be employed to make the intumescent sheet material.

Briefly, a flocculated slurry containing a number of components is prepared. The slurry includes heat resistant inorganic fibers, intumescent additive, binder and a carrier liquid. The slurry is flocculated with a flocculating agent and drainage retention aid chemicals. The flocculated mixture or slurry may be placed onto a papermaking machine to be formed into a ply or sheet of fiber containing paper. The sheet is dried by air drying or oven drying. For a more detailed description of standard papermaking techniques employed, see U.S. Pat. No. 3,458,329, the disclosure of which is incorporated herein by reference.

Alternatively, the plies or sheets may be formed by vacuum casting the slurry. According to this method, the slurry of components is wet laid onto a pervious web. A vacuum is applied to the web to extract the majority of the moisture from the slurry, thereby forming a wet sheet. The wet plies or sheets are then dried, typically in an oven. The sheet may be passed through a set of rollers to compress the sheet prior to drying.

Whether intumescent fire protection sheet material is prepared by standard papermaking or vacuum forming techniques, a char strength enhancing agent is included in the material composition. The addition of the char strength enhancing agent may occur during the formation of the wet sheet or after the sheet has been dried. In the case where the char strength enhancing agent is added during the formation of the wet sheet, it can be added by spraying the wet sheet with a solution of the agent. Alternatively, in the event that the char enhancing solution contains a solid oxide stabilizer, then the char enhancing agent may be added to the slurry of components during the wet forming process. The char enhancing agent may also be added after the intumescent sheet material is dried by impregnating or saturating the dried sheet with a solution of the char enhancing agent.

For embodiments that utilize sodium silicate as the char enhancing solution, the sodium silicate solution may comprise a mixture of liquid and solid product form with a ratio ranging from 1:1 to about 10:1 parts by weight. A certain illustrative ratio for the liquid to solid components of the char enhancing agent is about 5:1 parts by weight.

Methods of impregnation of the sheet material with the char enhancer include complete submersion of the sheet in a liquid system, or alternatively brushing, coating, dipping, rolling, splashing, or spraying the sheet. In a continuous procedure, a fiber mat which can be transported in roll form, is unwound and moved, such as on a conveyer or scrim, past spray nozzles which apply the binder to the mat. Alternatively, the mat can be gravity-fed past the spray nozzles. The mat/binder prepreg is then passed between press rolls, which remove excess liquid and densify the prepreg to approximately its desired thickness. The densified prepreg may then be passed through an oven to remove any remaining solvent and if necessary to partially cure the binder to form a composite. The drying and curing temperature is primarily dependent upon the binder and solvent (if any) used. The sheet material can also be made in a batch mode, by immersing a section of the sheet in a liquid binder, removing the prepreg and pressing to remove excess liquid.

In other embodiments, the components may be processed into an intumescent fire protection sheet material by conventional means such as dry air layering. The material at this stage has very little structural integrity and is very thick. Where the dry air layering technique is used, the mat may be alternatively processed by the addition of a binder to the mat by impregnation to form a fiber composite. In this technique, the binder is added after formation of the mat, rather than forming the mat prepreg as noted hereinabove with respect to the conventional papermaking technique. This method of preparing the mat aids in maintaining fiber length by reducing breakage.

Regardless of which of the above-described techniques are employed, the sheet material may be cut, such as by die stamping, to form sheets of exact shapes and sizes with reproducible tolerances.

Resilient intumescent fire protective sheets in a range of thicknesses can be produced. Sheets which are about 0.25 mm to about 25 mm thick are especially useful in firestop applications. Intumescent sheets of lesser thickness can be stacked to produce thicker material as a given application requires. Variations in the composition of the sheets lead to changes in its density in the range of about 0.04 to about 0.25 grams/cm$^3$.

EXAMPLES

The following examples are intended to merely further exemplify illustrative embodiments of the intumescent fire protection material and the process for preparing the material. It should be understood that these examples are for illustration only and should not be considered as limiting the claimed intumescent fire protection material, the process for preparing the intumescent fire protection materials, products incorporating the intumescent fire protection material and processes for using the intumescent fire protection material.

Specimens of intumescent fire protection sheet material were prepared for testing using sheet materials comprising the formulations as set forth in Table 1, and produced as described below.

TABLE 1

| Component (%) | Example 1 | Example 2 | Example 3 |
|---|---|---|---|
| Graphite | 25.00 | 32.14 | 39.29 |
| Insulfrax Fiber | 20.00 | 27.86 | 33.57 |
| E-Glass | 10.71 | 5.71 | 0.00 |
| Binder | 8.57 | 5.71 | 5.71 |
| Silicate | 35.71 | 28.57 | 21.43 |
| Total: | 100 | 100 | 100 |

Insulfrax ® fibers (Unifrax I LLC)
E-Glass = Chopped E-Glass (Owens Corning)
Graphite = Expandable Graphite (Asbury Graphite)
Binder = Acrylic Latex (Noveon)
Silicate = Sodium Silicate (PQ Corporation)

Comparative Example 4 ("C4") comprises a sodium silicate sheet commercially available from BASF under the trade name PALUSOL.

Comparative Example 5 ("C5") comprises an expanding graphite sheet commercially available from Technical Fiber Products (Burnside Mills, England).

The formulation ingredients for the intumescent fire protection sheet material were combined, mixed, and formed into sheets on a standard paper handsheet mold in accordance with standard wet forming procedures and using conventional retention mechanisms. The sheets were dried in a forced hot air oven. The intumescent fire protection sheets had a basis weight of about 400 g/m2. The sheets were then tested for LOI, thickness, density, and retention of graphite and fiber.

Fixed Gap Expansion Test

A 1 and 1/8" diameter sample of test material was die cut from a larger piece of material. The sample was weighed and the weight was recorded. The basis weight of the sample was then calculated and recorded. The thickness of the sample was measured and also recorded. Instron model 4202 was used for the Fixed Gap Expansion Test. A 50 KN load cell for maximum loads of 11,000 lbs, or a 1 KN load cell for maximum loads up to 225 lbs was used. The test material was placed within a fixed gap between two plates. The temperature of the test fixture was raised thereby activating the intumescent material in the test sample. As the intumescent material expands upon activation, it exerts pressures on one of the plates of the test fixture over time. These pressures were recorded and a pressure profile at a fixed gap was established.

Quantitative Char Strength

The enhanced char strength of the intumescent fire protection sheet material was evaluated using a fixed gap expansion test according to the protocol set forth above to determine the high temperature compression characteristics of materials at a constant (fixed) gap. FIG. 1 shows that upon heating in a fixed gap fixture, the inventive intumescent fire protection sheet material provides an expansion force that is greater than an intumescent sheet of graphite alone, and/or that can produce a holding force that is maintained over a larger temperature range.

Qualitative Char Strength

The enhanced char strength of the intumescent fire protection sheet material was also qualitatively evaluated using an erosion test according to determine erosion characteristics of the material. According to the erosion test, samples of the intumescent fire protection material were heated in a fixed gap fixture. The sheet material was cooled to room temperature, and then eroded with an airstream. The sheet material samples were assigned a ranking from 1 to 4, with 4 being the sample exhibiting the greatest amount erosion. The results are set forth in Table 2 below.

TABLE 2

| EXAMPLE | RANK | OBSERVATIONS |
|---|---|---|
| 1 | 2 | Minimal edge erosion |
| 3 | 3 | Some edge erosion |
| C4 | 1 | No erosion |
| C5 | 4 | Complete erosion |

Inventive Examples 1 and 3, which comprise an intumescent sheet material including a combination of expandable graphite and sodium silicate char enhancer, exhibited minimal edge erosion. Comparative Example C4, which is a sodium-silicate sheet material, did not exhibit any erosion. Comparative Example C5, which is an expandable graphite sheet material, exhibited complete erosion. These results show that an intumescent sheet material comprising a combination of expandable graphite and sodium silicate posses a better char strength as compared to an intumescent sheet material of expandable graphite only.

Activation Temperature Testing

The activation temperatures of the intumescent fire protection sheet materials, as compared to prior art sheet materials, was evaluated. The activation temperature of the sheet material is the temperature at which a load greater than 1 lb. is first exhibited in the 3 mm fixed gap expansion test. The results are shown in Table 3 below.

TABLE 3

| EXAMPLE | TEMPERATURE (° C.) |
|---|---|
| 1 | 229 |
| 3 | 245 |
| C4 | 140 |
| C5 | 268 |

The results in Table 3 show that the intumescent fire protection sheets materials of Inventive Examples 1 and 3 are activated at a temperature that is lower than the expandable graphite-based sheet material of Comparative Example C4, but higher than the sodium silicate-based sheet of Comparative Example C5.

Expansion Ratio

A sample of the fire protection material 1" (width)×7" (length) was cut from a larger piece of sheet material. The thickness of the sample was measured and recorded. The sample was placed onto an inorganic tray and placed into furnace for 15 minutes at a temperature of about 700° C. After 15 minutes in the furnace, the sample and the tray were removed from furnace and allowed to cool for 5 minutes. The average height of the expanded paper ($E^f$) is measured.

The free expansion ratio of the intumescent fire protection sheet materials was compared to graphite-based and sodium silicate-based sheet materials according to the protocol set forth above to determine the expansion ratio characteristics of the materials. The free expansion of the inventive intumescent sheet materials is about 20 times greater than the free expansion ratio of a graphite-based sheet, and more than 2 times greater than a sodium-silicate sheet, at 400° C.

Taken together, this data demonstrates that an intumescent fire protection sheet material comprising a combination of expandable graphite as the intumescent agent and sodium silicate as a char enhancing agent provides an expansion ratio similar to expandable graphite-based sheets and a char strength that minimizes shrinkage of the sheet material in response to exposure to elevated temperatures or thermal cycling.

While the intumescent material and process for preparing the same have been described in connection with various illustrative embodiments, it is to be understood that other similar embodiments may be used or modifications and additions may be made to the described embodiments for performing the same function disclosed herein without deviating therefrom. The embodiments described above are not necessarily in the alternative, as various embodiments may be combined to provide the desired characteristics. Therefore, the intumescent material and process should not be limited to any single embodiment, but rather construed in breadth and scope in accordance with the recitation of the appended claims.

The invention claimed is:

1. An intumescent fire protection material comprising:
   inorganic fiber comprising biosoluble alkaline earth silicate fibers;
   intumescent substance;
   char strength enhancer; and
   binder.

2. The intumescent fire protection material of claim 1, comprising:
   about 10 to about 50 weight percent inorganic fiber;
   about 20 to about 50 weight percent intumescent substance;
   about 10 to about 50 weight percent char strength enhancer; and
   about 2 to about 20 weight percent binder.

3. The intumescent fire protection material of claim 2, comprising:
   about 35 weight percent inorganic fiber;
   about 30 weight percent intumescent substance;
   about 30 weight percent char strength enhancer; and
   about 5 weight percent binder.

4. The intumescent fire protection material of claim 1, wherein said inorganic fibers comprise a combination of alkaline earth silicate fibers and at least one different fiber type selected from the group consisting of carbon fibers, glass fibers, ceramic fibers, and silica fibers.

5. The intumescent fire protection material of claim 4, wherein said ceramic fibers comprise alumina-silica fibers comprising the fiberization product of about 45 to about 75 weight percent alumina and about 25 to about 55 weight percent silica.

6. The intumescent fire protection material of claim 1, wherein said alkaline earth silicate fibers comprise calcia-magnesia-silica fibers, magnesia-silica fibers and combinations thereof.

7. The intumescent fire protection material of claim 6, wherein the magnesia-silica fibers comprise the fiberization product of about 65 to about 86 weight percent silica, about 14 to about 35 weight percent magnesia and 5 weight percent or less impurities.

8. The intumescent fire protection material of claim 6, wherein the calcia-magnesia-silica fibers comprise the fiberization product of about 45 to about 90 weight percent silica, greater than 0 to about 45 weight percent calcia, and greater than 0 to about 35 weight percent magnesia.

9. The intumescent fire protection material of claim 1, wherein said intumescent substance is selected from the group consisting of unexpanded vermiculite, expandable graphite, hydrobiotite, water-swelling tetrasilicic flourine mica and combinations thereof.

10. The intumescent fire protection material of claim 9, wherein said char strength enhancer comprises alkali metal silicates, acids and phosphates.

11. The intumescent fire protection material of claim 10, wherein said char strength enhancer comprises an alkali metal silicate.

12. The intumescent fire protection material of claim 11, wherein said intumescent material comprises expandable graphite and said char strength enhancer comprises sodium silicate.

13. The intumescent fire protection material of claim 1, wherein said binder comprises an organic binder which comprises a thermosetting binder or a thermoplastic binder.

14. The intumescent fire protection material of claim 13, wherein said organic binder is selected from the group consisting of acrylic latex, (meth)acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, silicones, polyesters, epoxy resins, polyvinyl esters and mixtures thereof.

15. The intumescent fire protection material of claim 14, further comprising an inorganic binder wherein said inorganic binder is selected from the group consisting of colloidal alumina, colloidal silica, colloidal zirconia and mixtures thereof.

16. The intumescent fire protection material of claim 1, further comprising at least one clay.

17. The intumescent fire protection material of claim 16, wherein said clay comprises attapulgite clay, ball clay, bentonite clay, hectorite clay, kyanite clay, kaolinite clay, montmorillonite clay, palygorskite clay, saponite clay, sepiolite clay, silimanite clay and combinations thereof.

18. An intumescent fire protection material comprising about 10 to about 50 weight percent biosoluble alkaline earth silicate fibers; about 20 to about 50 weight percent intumescent substance comprising expandable graphite; about 2 to about 20 weight percent binder; and about 10 to about 50 weight percent of a char strength enhancer selected from sodium silicate, acids, phosphates, and mixtures thereof.

19. A process for protecting an article from fire damage comprising locating an intumescent fire protection material according to claim 1 on, in, or around said article.

20. The intumescent fire protection material of claim 18, wherein said inorganic fibers are selected from the group consisting of carbon fibers, glass fibers, ceramic fibers, silica fibers, alkaline earth silicate fibers and combinations thereof.

21. The intumescent fire protection material of claim 20, wherein said ceramic fibers comprise alumina-silica fibers comprising the fiberization product of about 45 to about 75 weight percent alumina and about 25 to about 55 weight percent silica.

22. The intumescent fire protection material of claim 21, wherein said alkaline earth silicate fibers comprise calcia-magnesia-silica fibers, magnesia-silica fibers and combinations thereof.

23. The intumescent fire protection material of claim 22, wherein the magnesia-silica fibers comprise the fiberization product of about 65 to about 86 weight percent silica, about 14 to about 35 weight percent magnesia and 5 weight percent or less impurities.

24. The intumescent fire protection material of claim 22, wherein the calcia-magnesia-silica fibers comprise the fiberization product of about 45 to about 90 weight percent silica, greater than 0 to about 45 weight percent calcia, and greater than 0 to about 35 weight percent magnesia.

25. The intumescent fire protection material of claim 18, wherein said intumescent substance is selected from the group consisting of unexpanded vermiculite, expandable graphite, hydrobiotite, water-swelling tetrasilicic flourine mica and combinations thereof.

26. The intumescent fire protection material of claim 18, wherein said binder comprises an organic binder comprising a thermosetting binder or a thermoplastic binder.

27. The intumescent fire protection material of claim 26, wherein said organic binder is selected from the group consisting of acrylic latex, (meth)acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, silicones, polyesters, epoxy resins, polyvinyl esters and mixtures thereof.

28. The intumescent fire protection material of claim 27, further comprising an inorganic binder wherein said inorganic binder is selected from the group consisting of colloidal alumina, colloidal silica, colloidal zirconia and mixtures thereof.

29. The intumescent fire protection material of claim 18, further comprising at least one clay.

30. The intumescent fire protection material of claim 29, wherein said clay comprises attapulgite clay, ball clay, bentonite clay, hectorite clay, kyanite clay, kaolinite clay, montmorillonite clay, palygorskite clay, saponite clay, sepiolite clay, silimanite clay and combinations thereof.

31. A process for protecting an article from fire damage comprising locating an intumescent fire protection material according to claim 18 on, in, or around said article.

* * * * *